United States Patent

[11] 3,585,403

[72] Inventor John G. Gribbons
Rockaway, N.J.
[21] Appl. No. 761,980
[22] Filed Sept. 24, 1968
[45] Patented June 15, 1971
[73] Assignee Bell Telephone Laboratories Incorporated
Murray Hill, Berkeley Heights, N.J.

[54] AUXILIARY TURNOFF CIRCUIT FOR A THYRISTOR SWITCH
6 Claims, 5 Drawing Figs.

[52] U.S. Cl. .......... 307/252, 307/305, 315/340, 317/33, 321/11, 321/27, 323/22, 307/254, 307/247
[51] Int. Cl. .......... H03k 17/00
[50] Field of Search .......... 307/252, 305; 345/340; 317/33; 321/11, 27; 323/22

[56] References Cited
UNITED STATES PATENTS
3,261,990 7/1966 Huang .......... 307/252
3,404,293 10/1968 Harris et al. .......... 307/252

*Primary Examiner*—Donald D. Forrer
*Assistant Examiner*—J. P. Frew
*Attorneys*—R. J. Guenther and William L. Keefauver

ABSTRACT: An auxiliary turnoff circuit for a thyristor switch string in which a normally open switch, connected across at least one of the thyristors in the string, is caused to repeatedly close should the string permanently latch on. The first closure is timed to occur after the automatic turnoff circuit has failed to open the switch string and the closed intervals are greater than the normal recovery time of the thyristors in the string.

INVENTOR
J. G. GRIBBONS
BY
Walter M. Hill
ATTORNEY

AUXILIARY TURNOFF CIRCUIT FOR A THYRISTOR SWITCH

GOVERNMENT CONTRACT

The invention herein claimed was made in the course of, or under contract with the Department of the Army.

BACKGROUND OF THE INVENTION

This invention relates to nonlinear solid state device circuits and more particularly to an auxiliary turnoff circuit for a thyristor series string modulator circuit.

Solid state device modulator circuits of the prior art operate quite satisfactorily in the absence of gamma radiation or strong radio frequency interference. The modulator circuit disclosed in the copending application of W. B. Harris, R. P. Massey and F. J. Zgebura, Ser. No. 537,544, filed Mar. 25, 1966 now U.S. Pat. 3,404,293 and assigned to the same assignee as the present application is typical of such circuits which involve a series string of thyristors. An elementary form of modulator switch is shown on page 68 of the article by J. J. Aghassi, A. Najman and E. Simon, entitled "Here's a good switch: radiation-resistant thyristors, " ELECTRONICS for Apr. 1, 1968, pages 65 through 69. When the thyristors in such circuits are subjected to strong radio frequency interference or radiation fields they remain conductive for a period of time extending beyond the normal turnoff time of their automatic resonant turnoff circuits. This results in a permanently latched on condition because the energy stored in their resonant turnoff circuits is completely dissipated before the radiation field subsides, thereby making recovery by the resonant turnoff circuit impossible. The resonant turnoff circuit can be effective for only a short time which usually does not exceed 10 microseconds for most practical modulator circuits. In some systems it is imperative that recovery be effected in as short a time as possible after the environmental condition holding the thyristor switches in their conductive state subsides. Although the simple arrangement of a low impedance across the gate and cathode terminals of the thyristor circuit described in the above-cited ELECTRONICS article is operative for small currents, recovery by this method is impossible for the larger currents existing in the more practical higher power circuits.

The present invention is operative regardless of the duration of the latched on period or the amount of thyristor current and effects recovery promptly after the environmental radiation disappears.

SUMMARY OF THE INVENTION

This invention comprises a means for turning off a thyristor switch string which has become permanently latched on because of an environmental condition such as gamma radiation which has held the switch on over a period extending beyond the turnoff time of its automatic turnoff circuit. A normally open switch is connected across at least one of the thyristor switches in the string and a circuit means responsive to the drop in voltage across the string, repeatedly closes the normally open switch until the thyristor switch recovers. This circuit means causes the first closure to occur after the normal turnoff time has elapsed, each closed interval being longer than the normal recovery time of the thyristor.

BRIEF DESCRIPTION OF THE DRAWINGS

The invention may be better understood by referring to the accompanying drawings, in which.

DETAILED DESCRIPTION

Figure 1:
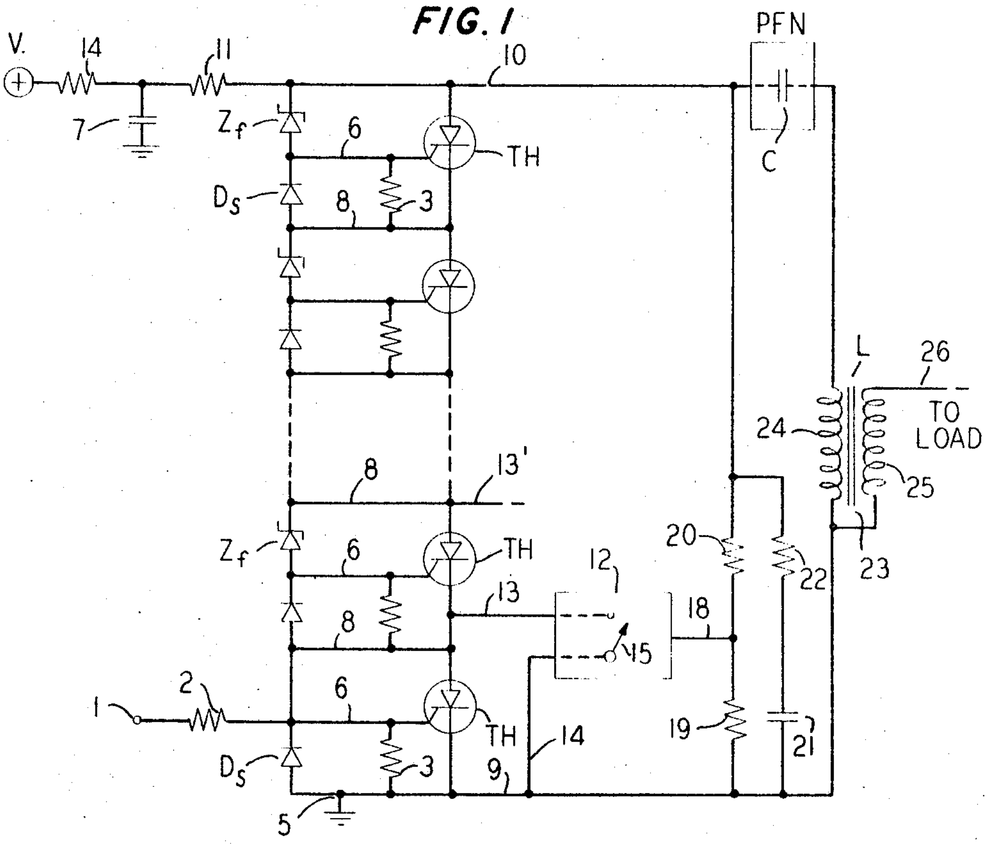
FIG. 1 discloses the essential features of a preferred embodiment of the invention.

FIG. 1 discloses a thyristor modulator circuit embodying a string of thyristors of the type disclosed in the above-noted copending application of W. B. Harris et al. The thyristor string comprises several thyristors TH connected in series between a grounded conductor 9 and the high-voltage conductor 10. Associated with each thyristor is a resistor 3 connected between its gate and cathode terminals, a slow recovery diode $D_s$ also connected between the gate and cathode terminals, and a fast recovery Zener diode $Z_f$ connected between the gate and anode terminals. As described in the copending application, these two diodes cooperate to guide the resonant turnoff currents through the various junctions of their associated thyristor in the proper sequence to effect a fast recovery of the thyristor. A more detailed description of this rather involved sequence is unnecessary to an understanding of the present invention. In fact, other types of series-connected thyristor circuits may be used in place of the one specifically shown in FIG. 1. Conductor 9 is grounded at 5 and, as is common with nearly all thyristor string switches, the entire string is caused to become conductive if any one or more of the thyristors in the string is made conductive. In FIG. 1, a trigger input terminal 1 is connected to the gate of the lowest thyristor in the string through a resistor 2. A positive-going pulse received at terminal 1 will cause the lowest thyristor in this string to become conductive. The voltage previously existing across this thyristor drops to substantially zero so that the voltage between conductors 9 and 10 is redistributed among the remaining thyristors. The Zener diodes $Z_f$ are so selected that their proportionate voltage will then exceed their Zener breakdown voltage and, consequently, these diodes will all become conductive to cause a current to flow from conductor 10 through the Zener diode and resistor 3 in each of the thyristor sections. Since the Zener diodes have now broken down, a voltage pulse exists across each of the resistors 3, thereby forcing all of the remaining thyristors to become conductive.

A conventional type of automatic turnoff circuit is shown in FIG. 1 which causes the thyristor string to become reset a short time interval after the string was rendered conductive. This resonant turnoff circuit comprises the inductance L of transformer 23 and the equivalent capacitance C of a conventional pulse forming network PFN. It will be understood that this capacitance had been charged by the voltage existing on line 10 prior to the time the thyristor switch string was made conductive and, when the thyristor string closes, current from this capacitor flows through the thyristor string and discharges its energy into the inductance L of transformer 23. This starts a ringing current, the second half cycle of which flows in the reverse direction through the switch string to cause all of the thyristors to recover. Voltage is supplied to high voltage conductor 10 from a voltage source +V through two series-connected resistors 4 and 11, the junction between these two resistors being brought to ground through a capacitor 7. So far as the present invention is concerned, it need only be understood that the normal mode of operation is for the switches to be turned on by a pulse arriving on trigger input terminal 1 causing the series string to close in the manner above described after which the ringing current is established from the network comprising inductance L and capacitance C to cause these thyristors to reopen. Upon closure of the thyristor string, the discharge of capacitance C causes a current pulse to pass through the primary winding 24 of transformer 23, thereby transmitting a pulse to the load by way of the secondary winding 25 and conductor 26.

The turnoff time exists for only about 10 microseconds for most practical switch circuits and during this interval the switches must reopen or all of the energy stored in the resonant circuit will become rapidly dissipated so that the switches cannot thereafter be automatically reopened but will remain permanently latched on. This condition can exist if the switches are subjected to radiation, for example gamma radiation, throughout a period greater than the normal turnoff time of the resonant turnoff circuit.

In accordance with the present invention, a thyristor switch circuit which has thus become permanently closed or latched on may be reopened by means of an auxiliary turnoff circuit associated with block 12 in FIG. 1. This circuit comprises a normally open switch 15 connected across at least one of the thyristor switches by way of conductors 13 and 14. The auxiliary turnoff circuit is timed to close its switch 15 after a time interval greater than that of the normal turnoff time of the resonant circuit providing the resonant circuit has failed to reopen the thyristor string. Switch 15 will remain closed for a time greater than the normal recovery time of the thyristors TH. If the thyristor string has not reopened upon the first closure of switch 15, this switch will continue to reclose repeatedly until the string recovers. Consequently, should the radiation condition continue to exist for an extended period of time, switch 15 will be caused to repeatedly close until the radiation condition has subsided. Switch 15 has a sufficiently low impedance to bypass substantially all of the current carried by the string around the thyristor switch or switches which it shunts, thereby permitting these thyristors to recover by recombination.

The fact that the thyristor switch string has failed to reopen will be sensed by the potentiometer circuit comprising resistors 19 and 20 connected in series across conductors 9 and 10. When the thyristor switch string has closed, the voltage across these two conductors drops to a very low value and, consequently, the fractional portion thereof existing across resistor 19 will be applied to the circuits in block 12 by way of conductor 18. This drop in voltage causes a timing circuit in block 12 to close switch 15 after a time interval exceeding the normal turnoff time of the resonant circuit.

Figure 2:
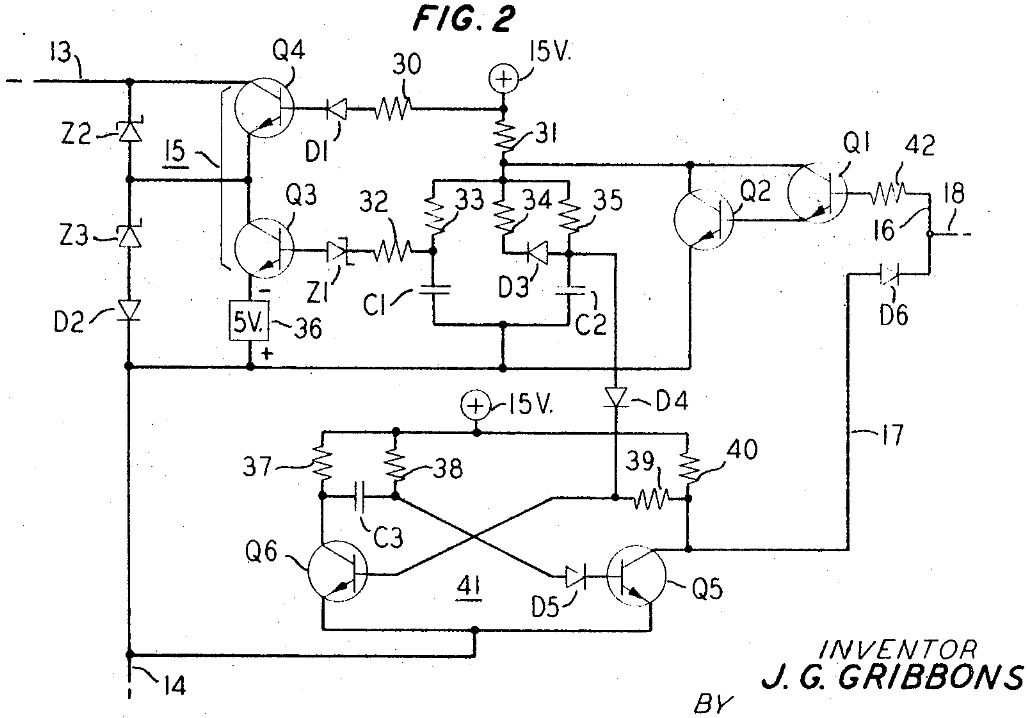
FIG. 2 discloses the normally open switch and its timing circuits associated with block 12 of FIG. 1.

Switch 15 and its timing circuits contained in block 12 of FIG. 1 is shown in a preferred form in FIG. 2. Conductors 13, 14 and 18 are connected into the circuit of FIG. 1 in the same manner shown for block 12. In this figure, switch 15 comprises two power transistors Q3 and Q4 which, when switched on, exhibit a very low impedance between their collectors and emitters and, consequently, present a very low impedance between conductors 13 and 14. The collectors and emitters of these two transistors are connected in series, the collector of transistor Q4 being connected to conductor 13 and the emitter of transistor Q3 being connected to conductor 14 through a small bias source 36. One Zener diode Z2 is connected across the collector and emitter terminals of transistor Q4 and a second Zener diode Z3 is connected across the collector and emitter terminals of transistor Q3 in series with a diode D2 and the low voltage bias source 36. The purpose of these two Zener diodes is to provide over-voltage protection for these two transistors. Should the voltage across conductors 13 and 14 substantially exceed the voltage rating of these transistors, Zener diodes Z2 and Z3 will break down in their reverse direction to bypass current around their respective transistors.

Conductor 18 is connected to the base of a transistor Q1 by way of a resistor 42 and conductor 16. A second transistor Q2 is connected in circuit with Q1 to form the well-known Darlington pair. So long as a voltage exists on conductor 18, current will flow through resistor 42 to the base of transistor Q1 causing both of these transistors to switch into their conductive states thereby establishing a low impedance between the collector and emitter of transistor Q2. The collector and emitter of transistor Q2 are connected across a pair of timing networks comprising capacitor C1, resistor 33, capacitor C2 and resistor 35. Resistor 33 is connected in series with capacitor C1 and resistor 35 is connected in series with capacitor C2 and these two series circuits are connected in parallel. Charging current comes from the +15 source connected to this parallel-connected network through a resistor 31, the return to the source being by way of conductor 14 which is connected to ground as shown in FIG. 1. The +15 source is also connected to the base of transistor Q4 through resistor 30 in series with a diode D1. The base of transistor Q3 is connected to the upper terminal of capacitor C1 by way of a Zener diode Z1 and a resistor 32. It will be understood that base current cannot flow through resistor 30 and diode D1 to the base of transistor Q4 so long as transistor Q3 is not conducting and base current will not flow to transistor Q3 until the voltage across capacitor C1 plus the bias voltage of source 36 exceeds the Zener breakdown voltage of diode Z1.

A sequence of operations leading to the closure of switch 15 may be described at this point. When the thyristor string shown in FIG. 1 closes, the voltage between conductors 9 and 10 lowers to a low value as previously described. Consequently, the voltage at conductor 18 is at a correspondingly low value. This voltage is low enough to cause transistors Q1 and Q2 to promptly open, removing the short circuit across the timing circuit comprising resistor 33 and capacitor C1. This permits charging current to flow into capacitor C1 by way of resistors 31 and 33. When the voltage on capacitor C1 reaches a critical level, Zener diode Z1 breaks down permitting current to flow into the base of transistor Q3. When this occurs, base current also promptly starts into the base of transistor Q4 by way of diode D1 and resistor 30, thereby causing both transistors to become strongly conductive and place a short circuit across conductors 13 and 14. The time constant of capacitor C1 and its two series-connected resistors 31 and 33 is such that transistor Q3 will not be conductive until a time greater than that required for the resonant turnoff network to operate has expired.

Assuming that the radiation condition causing the thyristors to latch on continues to persist so that the thyristors do not recover upon the first closure of switch 15, it will then be necessary to again reclose the switch. This is accomplished by the action of the one-shot multivibrator circuit 41 shown in FIG. 2. This multivibrator circuit comprises transistors Q5 and Q6 connected in a conventional circuit configuration comprising resistors 37, 38, 39 and 40 and capacitor C3. Transistor Q5 is normally conducting by reason of base current flowing through resistor 38 and diode D5 connected in series with its base. The voltage drop across resistor 38 causes capacitor C3 to charge with the polarity indicated by reason of current flowing to it through resistor 37. When switch 15 is closed in the manner described above, it will remain closed so long as voltage exists across capacitor C1. However, during the time that capacitor C1 was charging, capacitor C2 is also charging but at a slower rate by current through resistor 35 and, when the voltage across capacitor C2 reaches a predetermined limit, current flows from the upper terminal of this capacitor through diode D4 into the base of transistor Q6 and back to the lower terminal of capacitor C2 by way of the emitter of transistor Q6. This causes transistor Q6 to switch into conduction, thereby connecting the charged capacitor C3 across the base-emitter junction of transistor Q5 to back-bias both this junction and diode D5. This causes transistor Q5 to promptly turn off so that the voltage at its collector quickly rises to drive current into the base of transistor Q1 by way of resistor 40, conductor 17, diode D6 and resistor 42. As previously described, current flowing into the base of transistor Q1 causes a low impedance to exist between the collector and emitter of transistor Q2, thereby placing a short circuit across the parallel timing circuits comprising capacitors C1, C2 and their series-connected resistors. Capacitor C1 thereupon promptly begins discharging through resistor 33 while capacitor C2 discharges very rapidly through the parallel-connected network comprising resistor 35 and the series connected resistor 34 and diode D3. When the voltage across capacitor C1 gets below the critical level, current promptly ceases flowing into the base of transistor Q3, thereby causing switch 15 to open. This condition will continue until capacitor C3 has discharged and begins to take on a charge of opposite polarity. When this occurs, transistor Q5 turns on by reason of current flowing through diode D5 into its base. The collector of transistor Q5 then suddenly lowers in voltage to stop the current flow into the base of transistor Q1, once again removing the short from across the timing circuits comprising the capacitors C1 and C2. Conventional multivibrator action causes transistor Q6 to open when transistor Q5 closes. The cycle now continues to repeat with switch 15 repeatedly closing until such time that the thyristor string recovers to permit the voltage between conductors 9 and 10 to return toward normal. The voltage at conductor 18 also rises, holding transistors Q1 and Q2 in their conductive state and stopping the operation of switch 15.

Figure 3:
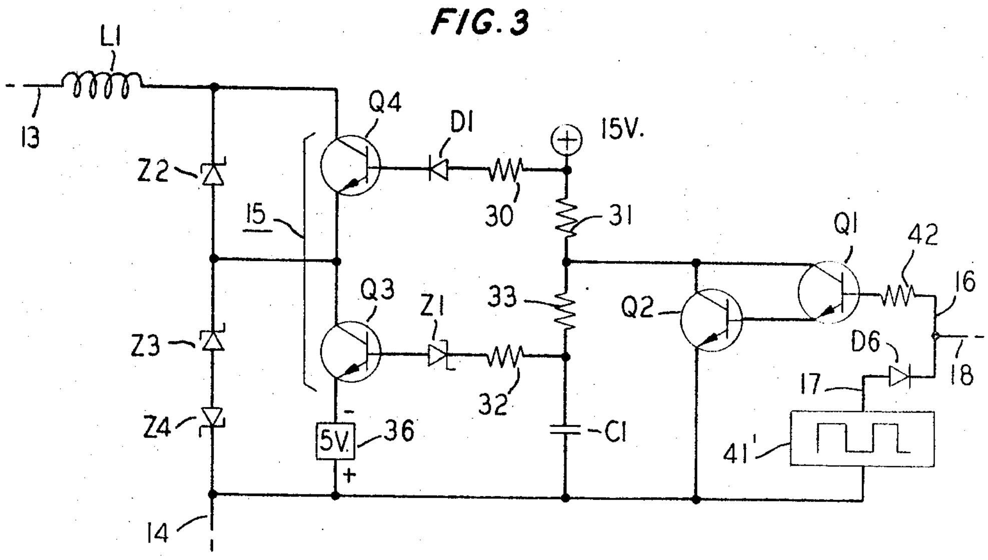
FIG. 3 discloses an alternative timing circuit which may be used in place of the circuits of FIG. 2.

The circuit of FIG. 3 is essentially the same as that shown in FIG. 2 except for the substitution of a rectangular waveform generator for the timing circuit involving capacitor C2 and the multivibrator 41. In FIG. 3, these have been replaced by the waveform generator 41′ which performs essentially the same function as do the timing circuit and the multivibrator of FIG. 2. So long as voltage is maintained between conductors 9 and 10 of FIG. 1, a voltage is maintained at conductor 18 so that transistors Q1 and Q2 remain conductive to maintain a short circuit across the timing circuit comprising resistor 33 and capacitor C1. The positive-going pulses from generator 41′ will have no effect on the operation of the circuit so long as the voltage is maintained at conductor 18. When the voltage on conductor 18 drops to a low value, the positive-going pulses coming from generator 41′ will apply current by way of conductor 17, diode D6 and resistor 42 into the base-emitter junction of transistor Q1, thereby intermittently causing transistor Q1 and Q2 to become conductive. It is essential, however, that the period of the waveform coming from generator 41′ be properly related with reference to the normal recovery time of the thyristors so that each positive-going pulse will exist for a period greater than their normal recovery time.

Under normal operating conditions, the voltage at conductor 18 drops to a low value each time the thyristor string is switched on. The time constant provided by capacitor C1 and resistors 31 and 33 is such that switch 15 will not be closed before the resonant turnoff network shown in FIG. 1 reopens the thyristor switch string. This, of course, restores the voltage at conductor 18 which turns transistors Q1 and Q2on, thereby stopping the charging of capacitor C1 and starting its immediate discharge through resistor 33 and the collector-emitter path of transistor Q2. The operation of the circuitry associated with switch 15 is identical with that previously described with reference to FIG. 2. Assume that radiation energy has caused the thyristors in the string to remain conductive beyond their normal turnoff time so that they become latched on. In this case, the voltage at conductor 18 would remain low, but for generator 41′ which will now begin to intermittently apply positive-going pulses to turn transistors Q1 and Q2 on, thereby starting a sequence whereby capacitor C1 is alternately charged and discharged to repeatedly close switch 15 in the same manner previously described for FIG. 2.

Figure 4:
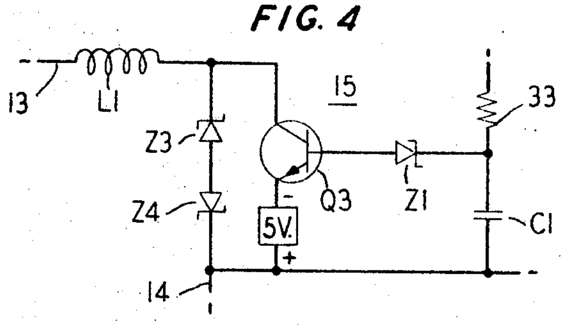
FIG. 4 discloses a simple form of transistor switch circuit for low-power modulator circuits to be used as the normally open switch shown in FIGS. 2 and 3.
Figure 5:
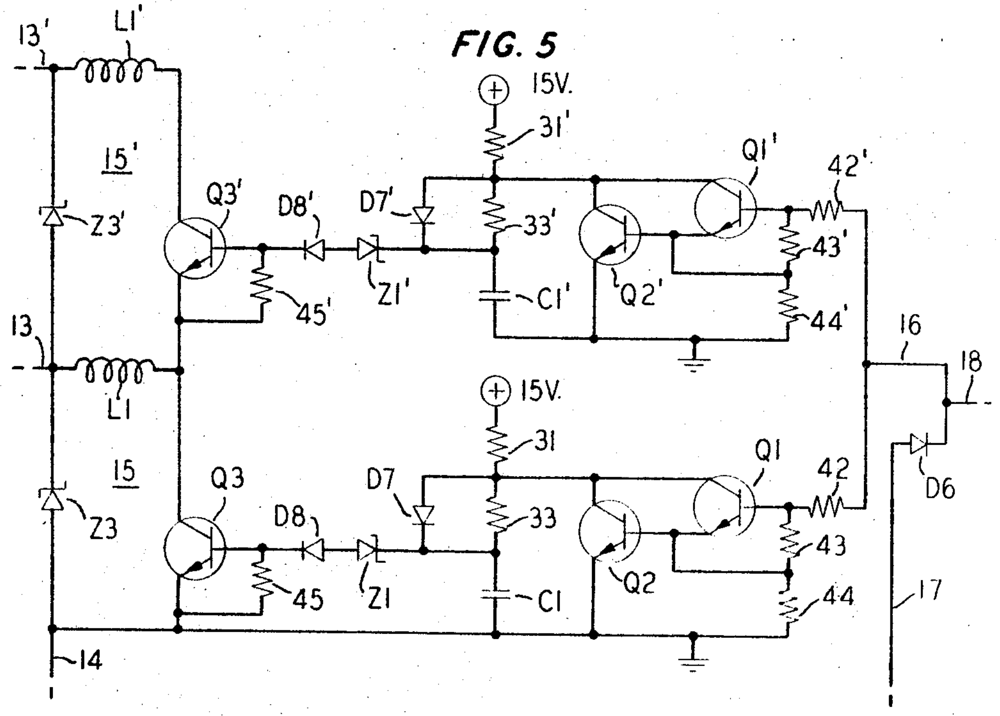
FIG. 5 discloses an alternative redundant switch arrangement which may be used in place of any of the circuits shown in FIGS. 2 through 4.

An inductor L1 is shown connected in series with the conductor 13 in FIGS. 3, 4 and 5. This inductor protects switch 15 in case the string is turned on by neutron bombardment of its thyristors. Inductor L1′ in FIG. 5 similarly protects switch 15′. Without the series impedance of these inductors, a short time large current surge could flow through the low impedance switch 15 and destroy it.

FIG. 4 shows a simple transistor switch 15 which may be used in place of the circuits of FIGS. 2 and 3 in low-power applications. The relationship of this circuit with the switch arrangement shown in FIG. 1 is obvious by its comparison with the circuits of FIG. 3.

FIG. 5 shows an alternative arrangement in which there is redundancy in the auxiliary turnoff switch circuits in that, in addition to transistors Q1 and Q2 and their associated circuits including transistor switch Q3, there is an identical duplication thereof involving transistor switches Q1′, Q2′ and Q′ and their associated circuits. The reference numerals used agree with those shown in FIG. 3 except that those in the redundant switch circuit all carry the prime designation. This switch is connected into the circuit of FIG. 1 by way of conductors 13, 13′, 14 and 18, conductor 17 being connected into a timing circuit in the same manner as shown in FIGS. 2 and 3. The circuit operation is identical to that previously described and it will be evident that, under normal circumstances where the thyristor string has become latched on, both switch 15 and switch 15′ are simultaneously operated, thereby placing short circuits across two or more of the thyristors in the string. The circuits are so designed that upon the recovery of one of the thyristors, the entire string may be caused to recover. It will, therefore, be evident that should one of the switches 15 or 15′ fail of operation, the other one can cause recovery of the thyristor string, thereby increasing the reliability of the circuit. An additional diode D8 and corresponding diode D8′ are connected in series with the bases of transistors Q3 and Q3′, respectively.

While the invention has been described with reference to some specific embodiments, it will be evident to those skilled in the art that various modifications may be made without departing from the scope of the invention.

What I claim is:

1. An auxiliary turnoff circuit for a thyristor switch circuit of the type having a string of thyristor switches connected in series and an automatic turnoff circuit for opening the switch circuit a timed interval after its closure, said auxiliary turnoff circuit comprising a normally open switch connected across at least one thyristor switch of said string, and means connected to said string of thyristors and responsive to a drop in voltage thereacross for repeatedly closing said normally open switch, the time period between successive ones of said repeated closings being greater than the timed interval of said automatic turnoff circuit while the time of each closing exceeds the normal recovery time of said thyristor switches.

2. The combination of claim 1 wherein said normally open switch comprising at least one transistor having a collector electrode connected to the anode of one of said thyristor switches and an emitter electrode connected to the cathode of the same thyristor switch.

3. The combination of claim 1 wherein said means connected to said string of thyristors for repeatedly closing said normally open switch comprises a timing circuit of a resistance means connected in series with a capacitor, means for alternately and repeatedly charging and discharging said capacitor through said resistance means in response to a drop in voltage across said thyristor string, and means connecting said capacitor to said normally open switch to close said switch each time said capacitor is charged.

4. An auxiliary turnoff circuit for a series string of thyristor switches subject to permanent latch on due to radiation or other causes maintaining conduction in said switches beyond their normal automatic turnoff time, said auxiliary turnoff circuit comprising a normally open switching means connected across at least one thyristor switch of said string, a voltage sensing means connected to said string deriving a voltage therefrom proportional to the voltage across the string, means coupling said voltage sensing means to said normally open switching means for repeatedly closing said normally open switching means as said derived voltage drops below a predetermined limit, the first of said closures occurring after the drop of said derived voltage a period of time greater than said normal automatic turnoff time while the closure time exceeds the normal recovery time of said thyristor switches.

5. The combination of claim 4 wherein said normally open switch comprises at least one transistor having a collector electrode connected to the anode of one of said thyristor switches and an emitter electrode connected to the cathode of the same thyristor switch.

6. The combination of claim 4 wherein said means coupling said voltage sensing means to said normally open switching means comprises a timing circuit of a resistance means connected in series with a capacitor, means for alternately and repeatedly charging and discharging said capacitor through said resistance means, and means connecting said capacitor to said normally open switching means to close said switch each time said capacitor is charged.